(12) United States Patent
Grolleman (10) Patent No.: US 10,479,036 B2
(45) Date of Patent: Nov. 19, 2019

(54) TIRE BUILDING DRUM WITH A TURN-UP MECHANISM

(71) Applicant: VMI Holland B.V., Epe (NL)

(72) Inventor: Henk-Jan Grolleman, Eerbeek (NL)

(73) Assignee: VMI HOLLAND B.V., Epe (NL)

( * ) Notice: Subject to any disclaimer, the term of this patent is extended or adjusted under 35 U.S.C. 154(b) by 255 days.

(21) Appl. No.: 14/901,100

(22) PCT Filed: Jun. 5, 2014

(86) PCT No.: PCT/NL2014/050360
§ 371 (c)(1),
(2) Date: Dec. 28, 2015

(87) PCT Pub. No.: WO2014/209110
PCT Pub. Date: Dec. 31, 2014

(65) Prior Publication Data
US 2016/0144585 A1 May 26, 2016

(30) Foreign Application Priority Data
Jun. 28, 2013 (NL) ..................................... 2011062

(51) Int. Cl.
*B29D 30/32* (2006.01)
*B29D 30/24* (2006.01)
(52) U.S. Cl.
CPC ........... *B29D 30/32* (2013.01); *B29D 30/244* (2013.01); *B29D 2030/3257* (2013.01); *B29D 2030/3264* (2013.01)
(58) Field of Classification Search
CPC .................... B29D 30/18; B29D 30/32; B29D 2030/3221; B29D 2030/3242;
(Continued)

(56) References Cited

U.S. PATENT DOCUMENTS 3,900,179 A * 8/1975 Mocny .................... E04G 17/16
248/287.1
6,318,434 B1 11/2001 Gutknecht et al.
(Continued)

FOREIGN PATENT DOCUMENTS

EP 2204277 7/2010
JP 2001-525748 12/2001
(Continued)

OTHER PUBLICATIONS

Machine generated English language translation of JP 2009-154471 (original document dated Jul. 2009).*
(Continued)

*Primary Examiner* — Jacob T Minskey
*Assistant Examiner* — Melody Tsui
(74) *Attorney, Agent, or Firm* — Young & Thompson (57) ABSTRACT

Disclosed is a tire building drum having tire components thereon, wherein the tire building drum is provided with a turn-up mechanism for turning-up parts of the tire components, wherein the turn-up mechanism includes a group of arms, wherein each group of arms includes primary arms and secondary arms interposed between the primary arms, wherein, the primary arms and the secondary arms are provided with primary pressing elements and secondary pressing elements, respectively, for exerting a pressing force onto the tire components during the turning-up, wherein the primary pressing elements are in a leading position, wherein the secondary arms are provided with actuators which are arranged for displacing the secondary pressing elements from an axially trailing position with respect to the axial position of the primary pressing elements in the leading position towards the same axial position as the primary pressing elements in the leading position.

18 Claims, 6 Drawing Sheets

(58) Field of Classification Search
CPC ...... B29D 2030/325; B29D 2030/3257; B29D 2030/3264
See application file for complete search history.

(56) References Cited

U.S. PATENT DOCUMENTS

| | | | |
|---|---|---|---|
| 6,974,147 B1* | 12/2005 | Kolda | B60D 1/52 |
| | | | 280/506 |
| 7,316,256 B2 | 1/2008 | Slots et al. | |
| 8,807,185 B2 | 8/2014 | Morisaki | |
| 8,945,323 B2* | 2/2015 | Fujiki | B29D 30/28 |
| | | | 156/130.3 |
| 2002/0124968 A1 | 9/2002 | Gutknecht et al. | |
| 2005/0244528 A1* | 11/2005 | Slots | B29D 30/245 |
| | | | 425/35 |
| 2007/0068631 A1 | 3/2007 | Painter | |
| 2010/0043949 A1* | 2/2010 | Fujiki | B29D 30/28 |
| | | | 156/123 |
| 2010/0107828 A1* | 5/2010 | Huerta | B25B 13/461 |
| | | | 81/177.9 |
| 2010/0193137 A1 | 8/2010 | Morisaki | |
| 2011/0111654 A1* | 5/2011 | Porta | B63H 20/106 |
| | | | 440/61 R |
| 2012/0302410 A1* | 11/2012 | Kitchens | A63B 21/00047 |
| | | | 482/96 |
| 2013/0139971 A1 | 6/2013 | Morisaki | |
| 2013/0192687 A1* | 8/2013 | Bowie | F16L 41/06 |
| | | | 137/15.01 |

FOREIGN PATENT DOCUMENTS

| | | | | |
|---|---|---|---|---|
| JP | 2004-268371 | | 9/2004 | |
| JP | 2006-502890 | | 1/2006 | |
| JP | 2008-296406 | | 12/2008 | |
| JP | 2009-154471 | * | 7/2009 | ............ B29D 30/34 |
| JP | 2009154471 A | * | 7/2009 | |
| JP | 2011-084003 | | 4/2011 | |
| JP | 2011-88414 | * | 5/2011 | ............ B29D 30/28 |
| WO | 9852740 | | 11/1998 | |
| WO | 2004035301 | | 4/2004 | |

OTHER PUBLICATIONS

Machine generated English language translation of JP 2011-88414 (original document dated May 2011) (Year: 2011).*
International Search Report PCT/NL2014/050360 dated Aug. 21, 2014.
Japanese Office Action for Application No. 2016-523685, dated Mar. 5, 2018, with English translation provided.

* cited by examiner

TIRE BUILDING DRUM WITH A TURN-UP MECHANISM

BACKGROUND

The invention relates to a tyre (tire) building drum with a turn-up mechanism.

Tyre building drums with turn-up mechanisms are known from WO 2004/035301 and WO 98/52740. The turn-up mechanisms of said known tyre building drums comprise a set of primary arms and a set of secondary arms situated between the primary arms. The primary arms and the secondary arms are provided with primary turn-up rollers and secondary turn-up rollers, respectively, for pressing against the tyre components during turning-up. The secondary turn-up rollers are situated behind the primary turn-up rollers of the adjacent primary arms in the axial direction of the tyre building drum. As a result, during turning-up, the secondary turn-up rollers are trailing the primary turn-up rollers in both the axial and the radial direction of the tyre building drum. An advantage of said known tyre building drums is that the tyre components can be pressed by the turn-up rollers at the radial position of the primary turn-up rollers and additionally at the radially trailing position of the secondary turn-up rollers.

A disadvantage of the known turn-up mechanisms is that, especially during the high stage of the turn-up, when the turn-up rollers are approaching the outer radial circumference of the tyre, the turn-up rollers are spread far apart in the circumferential direction of the tyre building drum. The pressing force of the spread apart turn-up rollers is unevenly distributed over the circumference of the tyre, thereby causing impressions on the tyre components.

It is an object of the present invention to provide a tyre building drum with a turn-up mechanism, in which the spreading of the pressure of the turn-up mechanism over the tyre components is increased.

SUMMARY OF THE INVENTION

According to a first aspect, the invention provides a tyre building drum for building a green tyre having tyre components of rubber, including two beads, wherein the tyre building drum comprises a drum shaft and two bead holders arranged around the drum shaft, wherein the bead holders are mutually spaced apart in the axial direction of the drum shaft for supporting the tyre components at the location of the beads, wherein the tyre building drum is provided with expansion means for radially expanding the part of the tyre components situated between the bead holders, wherein the tyre building drum is provided with a turn-up mechanism for turning-up the part of the tyre components situated outside of the bead holders around the beads against the expanded part of the tyre components to form the green tyre, wherein the turn-up mechanism comprises a group of arms arranged on each side of the drum shaft outside of the bead holders, wherein, at a first end, the arms of each group are coupled to the drum shaft via an axially moveable arm support, wherein the arms extend from the arm support towards the bead holders in radial planes equally distributed about the drum shaft, wherein the arms are arranged to be tiltable in said radial planes about their coupling with the arm support between a low position and a high position, wherein each group of arms comprises primary arms and secondary arms interposed between the primary arms, wherein the primary arms and the secondary arms, at a second end opposite to the first end, are provided with primary pressing elements and secondary pressing elements, respectively, for exerting a pressing force onto the tyre components during the turning-up, wherein the primary pressing elements are in a leading position, wherein the secondary arms are provided with actuators which are arranged for displacing the secondary pressing elements from an axially trailing position with respect to the axial position of the primary pressing elements in the leading position towards the same axial position as the primary pressing elements in the leading position.

The secondary pressing elements can thus be axially displaced towards the leading position of the primary pressing elements so that the secondary pressing elements may contribute to the equal spreading or distribution of the pressing force over the circumference of the tyre components at or near the leading position of the primary pressing elements. In this way the pressing force per unit of the surface area and thus the risk of imprints on the tyre components can be reduced.

In an embodiment the actuators are arranged for displacing the secondary pressing elements from the axially trailing position with respect to the leading position of the primary pressing elements into substantially the same and preferably the same axial position as the primary pressing elements in the leading position. With the secondary pressing elements in the same axial position as the primary pressing elements, the surface area of the pressing elements exerting a pressing force at said axial position can be significantly increased. In this way the pressing force per unit of the surface area and thus the risk of imprints on the tyre components can be reduced.

In an embodiment the secondary pressing elements, in the axially trailing position, are in a radially trailing position with respect to the radial position of the primary pressing elements in the leading position, wherein, the actuators are arranged for displacing the secondary pressing elements towards the same radial position as the primary pressing elements in the leading position. The secondary pressing elements can thus be radially displaced towards the leading position of the primary pressing elements so that the secondary pressing elements may even further contribute to the equal distribution of the pressing force over the tyre components at or near the leading position of the primary pressing elements. In this way the pressing force per unit of the surface area and thus the risk of imprints on the tyre components can be reduced.

In an embodiment the actuators are arranged for displacing the secondary pressing elements into substantially the same or the same radial position as the primary pressing elements in the leading position. With the secondary pressing elements in the same radial position as the primary pressing elements, the surface area of the pressing elements exerting a pressing force at said radial position can be significantly increased. In this way the pressing force per unit of the surface area and thus the risk of imprints on the tyre components can be reduced.

In an embodiment the secondary pressing elements are arranged to be moved from the trailing position into the leading position when the primary arms are tilted from their low positions into their high positions. Particularly in the high positions of the primary arms, the risk of imprints on the tyre components is high, as the primary pressing rollers are conventionally spread far apart in their individual radial planes. Thus, by displacing the secondary pressing elements into the leading positions when the primary pressing rollers are approaching their high positions, the risk of imprints can be reduced. Meanwhile, in the low position, having the secondary pressing elements in the trailing position allows for a compact arrangement of the arms in the circumferential direction of the drum shaft.

In an embodiment the primary pressing elements, during the tilting of the primary arms from their low positions to their high positions, are arranged to diverge with respect to each other in the circumferential direction of the drum shaft, wherein the actuators are arranged to displace the secondary pressing elements from the trailing position to the leading position when the space consumed by the individual secondary pressing elements in the circumferential direction of the drum shaft is less than the smallest space between two directly subsequent primary pressing elements in the same circumferential direction. This allows for the secondary pressing elements to be inserted or accommodated between said two directly subsequent primary pressing elements without interfering with said two directly subsequent primary pressing elements.

In an embodiment the secondary pressing elements are arranged to be displaced a substantially longitudinal direction of their respective secondary arms. The secondary pressing elements can thus be moved parallel to or in-line with the longitudinal direction of the secondary arms.

In an embodiment each of the secondary arms comprises a first arm part and a second arm part, wherein the first arm part is coupled to the arm support of the respective group of arms and wherein the second arm part is moveable with respect to the first arm part and holds the secondary pressing element. By dividing the secondary arm into two parts, the relative displacement of the secondary pressing element with respect to said arm can be facilitated.

In an embodiment the actuators are arranged on the secondary arms. In this manner, the secondary arms can be self-sufficient in the displacement of the secondary pressing elements. For the displacement of the secondary pressing elements, there is no need for an external drive to be connected to the secondary arm, for example via the arm support. The secondary arm can thus remain relatively simple in construction. Furthermore, the displacement of the secondary pressing elements of the secondary arms can be individually controlled.

In an embodiment the actuators are operationally arranged between the first arm part and the second arm part of the respective secondary arms, for moving the second arm part with respect to the first arm part.

In an embodiment the first arm part and the second arm part define the overall length of the secondary arm, wherein the second arm part is arranged to be moveable with respect to the first arm part within a range that allows for the overall length of the secondary arm to be smaller than, or equal to the overall length of the primary arm. This range allows for the secondary pressing elements to trail the primary pressing elements during the turning-up, and to catch up with the primary pressing elements during the turning-up.

In a preferred embodiment the actuators are linear actuators, preferably pneumatic drives.

In an embodiment the secondary arms are independently rotatable about their coupling with the arm support with respect to the primary arms. Thus, the secondary pressing elements of the secondary arms can exert a pressing force against a different part of the tyre components, as well as the same part of the tyre components.

In an embodiment the primary and secondary pressing elements are substantially identical, and preferably identical. By having substantially identical pressing elements, the equal distribution of the pressing force on the tyre components by said pressing elements can be achieved.

In an embodiment the primary and secondary pressing elements are primary and secondary turn-up rollers, respectively. The rollers can roll over the tyre components, thereby reducing the risk of imprints on the tyre components during the turning-up.

In an embodiment the diameter of the primary and secondary turn-up rollers are substantially the same, and preferably the same. Thus, when the secondary turn-up rollers are in the same axial and/or radial position as the primary turn-up rollers, the circumferential pressing surfaces on the outside of the turn-up rollers are situated in the same axial and/or radial position, and/or in the same circumference.

According to a second aspect, the invention provides a method for building a green tyre having tyre components of rubber, including two beads, wherein the method comprises the steps of arranging the tyre components around a drum shaft, clamping the tyre components at the beads, expanding the part of the tyre components situated between the beads and turning-up the part of the tyre components situated outside the beads around the beads against the expanded part of the tyre components to form the green tyre, wherein the method further comprises the step of exerting a pressing force onto the tyre components during the turning-up, wherein the pressing force is exerted by primary pressing elements and secondary pressing elements, wherein the primary pressing elements are in a leading position, wherein the method further comprises the step of displacing the secondary pressing elements from an axially trailing position with respect to the axial position of the primary pressing elements in the leading position towards the same axial position as the primary pressing elements in the leading position.

The secondary pressing elements can thus be axially displaced towards the leading position of the primary pressing elements so that the secondary pressing elements may contribute to the equal distribution of the pressing force over the tyre components at or near the leading position of the primary pressing elements. In this way the pressing force per unit of the surface area and thus the risk of imprints on the tyre components can be reduced.

In an embodiment the secondary pressing elements are displaced from the axially trailing position with respect to the leading position of the primary pressing elements into substantially the same and preferably the same axial position as the primary pressing elements in the leading position. With the secondary pressing elements in the same axial position as the primary pressing elements, the surface area of the pressing elements exerting a pressing force at said axial position can be significantly increased. In this way the pressing force per unit of the surface area and thus the risk of imprints on the tyre components can be reduced.

In an embodiment the secondary pressing elements, in the axially trailing position, are in a radially trailing position with respect to the radial position of the primary pressing elements in the leading position, wherein, the secondary pressing elements are displaced towards the same radial position as the primary pressing elements in the leading position. The secondary pressing elements can thus be radially displaced towards the leading position of the primary pressing elements so that the secondary pressing elements may even further contribute to the equal distribution of the pressing force over the tyre components at or near the leading position of the primary pressing elements. In this way the pressing force per unit of the surface area and thus the risk of imprints on the tyre components can be reduced.

In an embodiment the secondary pressing elements are displaced into substantially the same or the same radial position as the primary pressing elements in the leading position. With the secondary pressing elements in the same radial position as the primary pressing elements, the surface area of the pressing elements exerting a pressing force at said radial position can be significantly increased. In this way the pressing force per unit of the surface area and thus the risk of imprints on the tyre components can be reduced.

In an embodiment the part of the tyre components situated between the bead is expanded into a shape with a radial sidewall, wherein the radial sidewall is divided into a inner radial portion or low portion and a outer radial portion or high portion, wherein the secondary pressing elements are moved from the trailing position into the leading position when the primary pressing elements are moved from the low portion to the high portion of the tyre components. Particularly at the high portion of the tyre components, the risk of imprints on the tyre components is high, as the primary pressing rollers are conventionally spread far apart. Thus, by displacing the secondary pressing elements into the leading positions when the primary pressing rollers are approaching high portion of the tyre components, the risk of imprints can be reduced.

In an embodiment the primary pressing elements, during the movement of the primary pressing elements from the low portion towards the high portion of the tyre components, are diverging with respect to each other in the circumferential direction of the drum shaft, wherein the secondary pressing elements are displaced from the trailing position into the leading position when the space consumed by the individual secondary pressing elements in the circumferential direction of the drum shaft is less than the space between two directly subsequent primary pressing elements in the same circumferential direction. This allows for the secondary pressing elements to be inserted or accommodated between said two directly subsequent primary pressing elements without interfering with said two directly subsequent primary pressing elements.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

FIGS. 1A-6A show a tyre building drum 1 for building an unvulcanized or green pneumatic tyre 4. The tyre building drum 1 is provided with a turn-up mechanism 6 according to an exemplary embodiment of the invention, for turning-up rubber tyre components to form said green tyre 4.

Figures 1A, 1B:
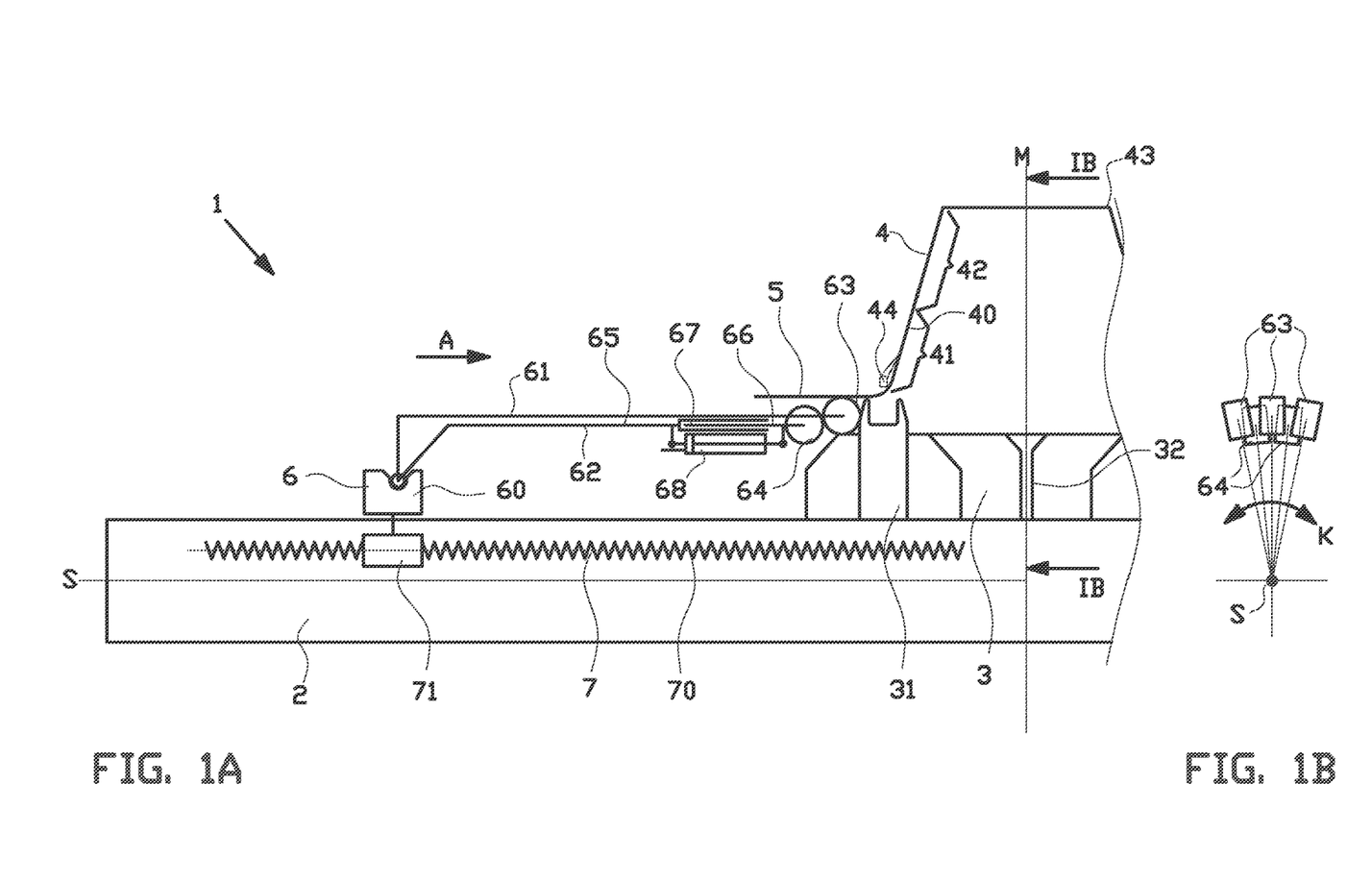
FIG. 1A shows a front view of a section of a tyre building drum with a turn-up mechanism according to an exemplary embodiment of the invention.
FIG. 1B shows a side view of the section of the tyre building drum with the turn-up mechanism according to the line IB-IB in FIG. 1A.

As shown in FIG. 1A, the tyre building drum 1 is provided with a drum shaft 2 having a center line or axis S. The tyre building drum is substantially rotation-symmetrical about the axis S of the drum shaft 2 and is additionally symmetrical about a mid plane M, which extends perpendicular to the axis S of the drum shaft 2. Thus, to avoid unnecessarily complex drawings, only one section of the tyre building drum 1 is shown in FIG. 1A. More specifically, FIG. 1A shows the top part of the left symmetrical side of the tyre building drum 1. Although the following description is limited to the description of the section of the tyre building drum 1 as shown in FIG. 1A, it is to be understood that the description also applies to the other symmetrical sections of the tyre building drum 1.

As shown in FIG. 1A, the tyre building drum 1 is provided with drum components 3 arranged around the drum shaft 2 at the mid plane M for supporting the tyre components for the green tyre 4 around the drum shaft 2 at the mid plane M. The tyre components 3 comprise an annular bead clamp or bead holder 31 arranged around the drum shaft 2 on each side of the mid plane M. The bead holders 31 are symmetrically spaced apart in the axial direction S of the drum shaft 2 to clamp or hold the tyre components for the green tyre 4 at spaced apart positions along the dimensions thereof. The drum components 3 further comprise an shaping means, for example an expansion or inflation element 32, for shaping or expanding the tyre components for the green tyre 4 into the required expanded, torus-like shape as shown in FIG. 1A.

The rubber tyre components for the green tyre 4 comprise rubber layers with reinforcement cords, which together with an inner liner form a carcass 40 for said green tyre 4. In the expanded shape as shown in FIG. 1A, the carcass 40 has radially and circumferentially extending side surfaces, each with an inner radial portion or low portion 41 and an outer radial portion or high portion 42. In FIG. 1A, the portions 41, 42 are schematically indicated with braces. It is noted that the radial height of the shaped carcass 40 is not necessarily divided into two equal heights. The transition between the portions 41, 42 can be at a different radial height, depending on the type of tyre to be manufactured. The sides of the carcass are joint by a radially outer circumferential surface 43, which defines the radially outer diameter of the carcass 40.

The rubber tyre components further comprise beads 44 which, in this example, are provided with a nigh filler strip or an apex. During the placement of the tyre components on the drum components 3, prior to expanding the carcass 40 to the shape as shown in FIG. 1A, the tyre components for the green tyre 4 are positioned with the beads 44 directly above the bead holders 31. Subsequently, the bead holders 31 are radially expanded to provide an air-tight clamping at the beads 44. The part of the carcass 40 between the bead holders 40 can now be expanded to the aforementioned expanded shape in a manner which is known per se. The carcass 40 on both sides outside of the bead holders 31 is provided with sidewalls 5 which are arranged to be folded onto or turned-up by the turn-up mechanism 6 against the radial side of the expanded carcass 40 in a manner which will be described hereafter. The number and the type of tyre components depends on the green tyre 4 to be manufactured in the end, and the possible compositions and build-up are sufficiently known to the person skilled in the art, so that they will not be further discussed here.

The turn-up mechanism 6 comprises a group of arms 61, 62 arranged on each side of the drum shaft 2 with respect to the mid plane M, outside of the bead holders 31. At a first distal end of the arms 61, 62 with respect to the bead holders 31, the arms 61, 62 of each group are coupled to the drum shaft 2 via an arm support 60. Preferably, the arms 61, 62 of the same group of arms are coupled to the drum shaft 2 via a single arm support 60. In this exemplary embodiment, the arm support 60 extends annularly around the drum shaft 2 and is arranged to be shiftable or moveable in the axial direction S of the drum shaft 2. The arms 61, 62 extend from the arm support 60 towards the bead holders 31 in radial planes which are equally distributed in the circumferential direction about the drum shaft 2, in a manner which is known per se, for example from WO 2004/035301 and WO 98/52740.

Figures 4A, 4B:
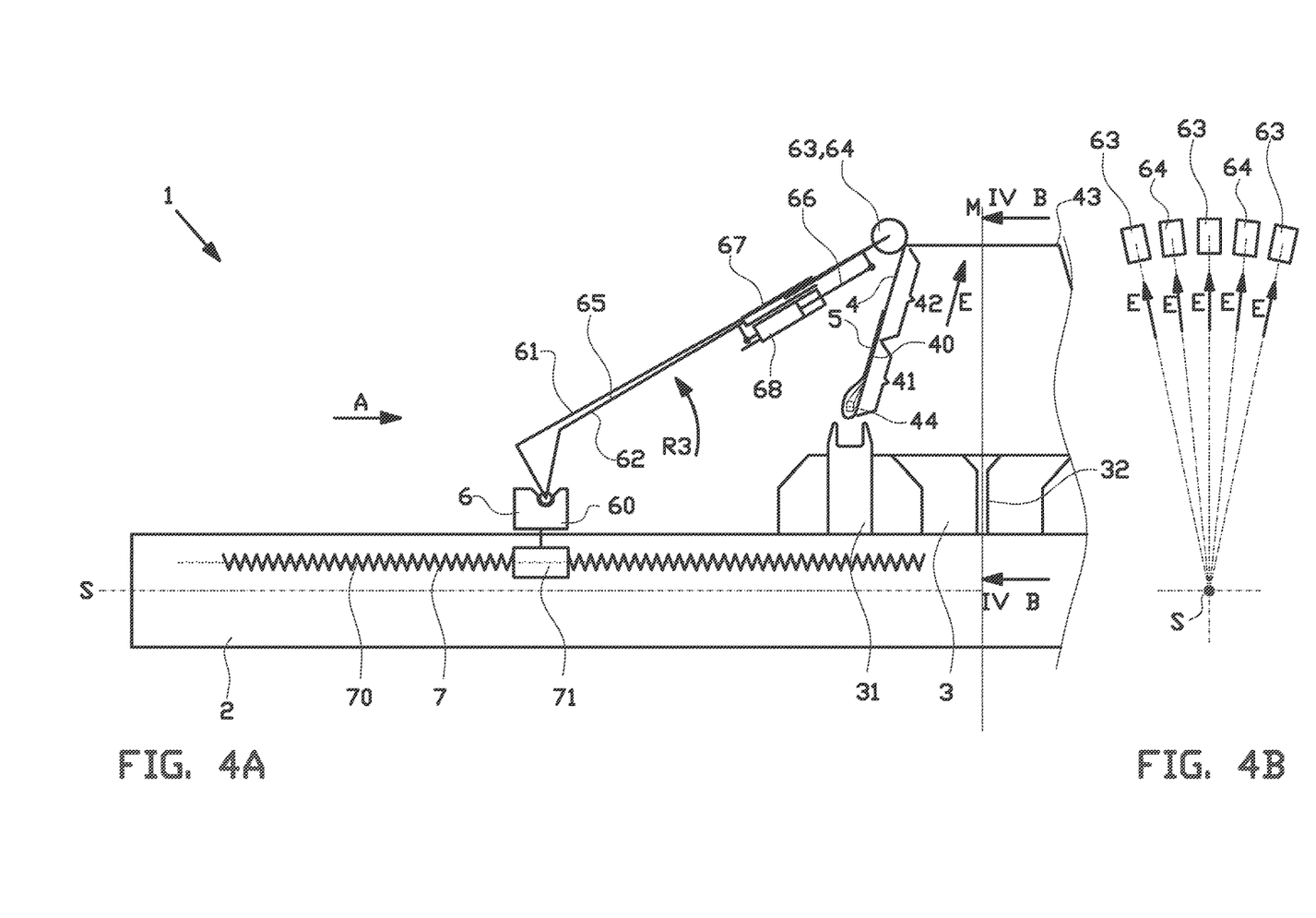

In FIG. 1A, only one of the radial planes and one of each type of arm 61, 62 are shown. In FIG. 1B, the radial planes are schematically shown by the diverging dashed lines originating from the center axis S of the drum shaft 2. Again, to prevent unnecessarily complex drawings, only five of the subsequent radial planes are shown. It is however to be understood that the total number of radial planes is equally distributed in the circumferential direction K about the center axis S over a full revolution of 360 degrees. The arms 61, 62 are arranged to be rotatable or tiltable in said radial planes about their coupling with the arm support 60 between a low position, as shown in FIG. 1A, and a high position, as shown in FIG. 4A.

Each group of arms 61, 62 comprises primary arms 61 and secondary arms 62. Each of the secondary arms 62 is placed or interposed between two directly subsequent primary arms 61 in the circumferential direction of drum shaft 2. At a second end opposite to the first end, the primary arms 61 are provided with fork-like ends (not shown) for holding primary pressing elements, formed as free-running primary turn-up rollers 63. Such a fork-like arrangement is known per se, for example from WO 2004/035301. The primary turn-up rollers 63 have a circumferential surface which is arranged to come into abutment or contact with the tyre components for the green tyre 4. As such, the primary turn-up rollers 63 of the primary arms 61 together define a circumferential series of primary pressing surfaces for exerting a pressing force against the tyre components for the green tyre 4 during turning-up. Similarly, at a second end opposite to the first end, the secondary arms 62 are provided with fork-like ends (not shown) for holding secondary pressing elements, formed as free-running secondary turn-up rollers 64. The secondary turn-up rollers 64 have a circumferential surface which is arranged to come into abutment or contact with the tyre components for the green tyre 4. As such, the secondary turn-up rollers 64 of the secondary arms 62 together define a circumferential series of secondary pressing surfaces for exerting a pressing force against the tyre components for the green tyre 4 during turning-up.

Figure 2A:
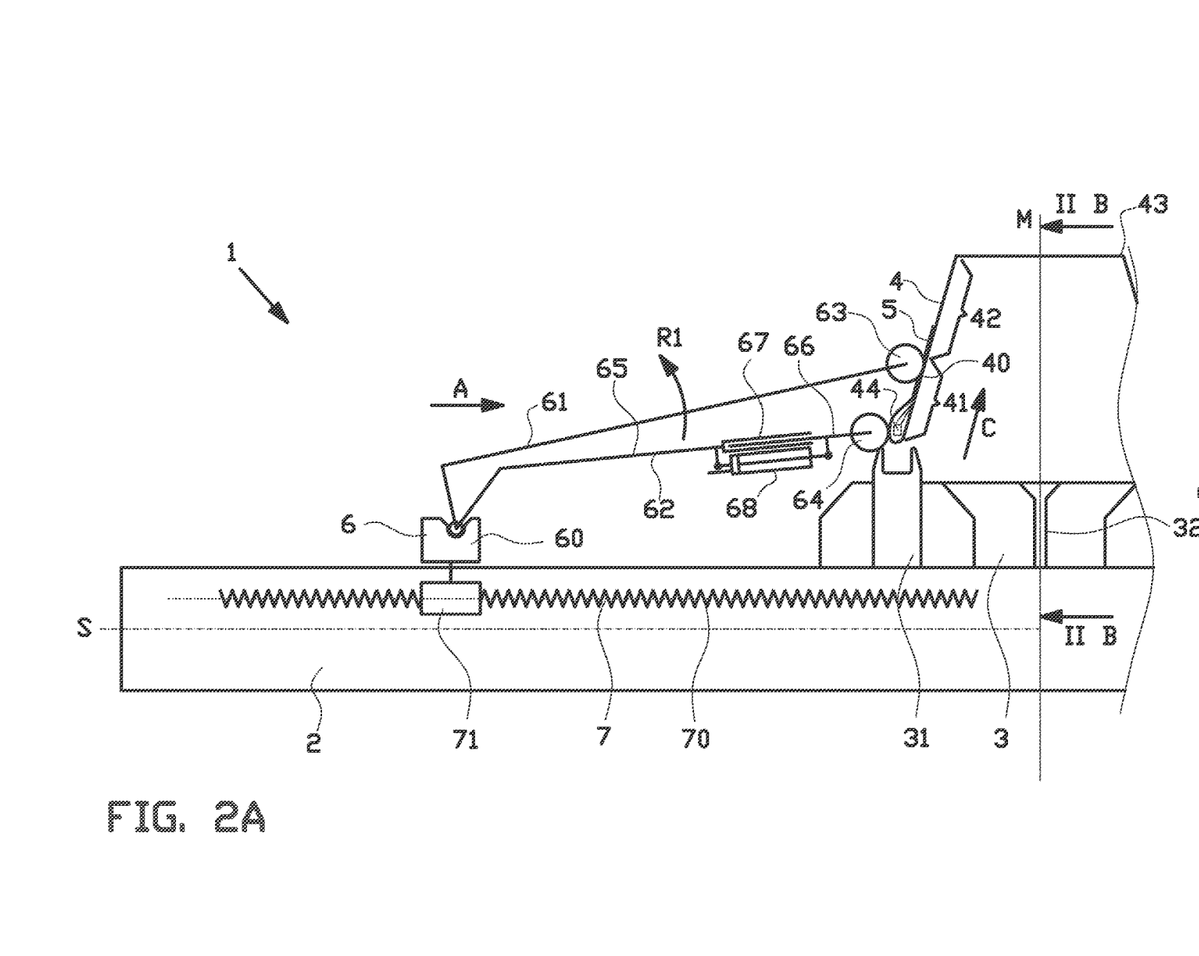
FIGS. 2A, 3A, 4A, 5A and 6A show front views of the section of the tyre building drum with the turn-up mechanism according to FIG. 1A during the steps of a method for turning up tyre components.
Figures 3A, 3B:
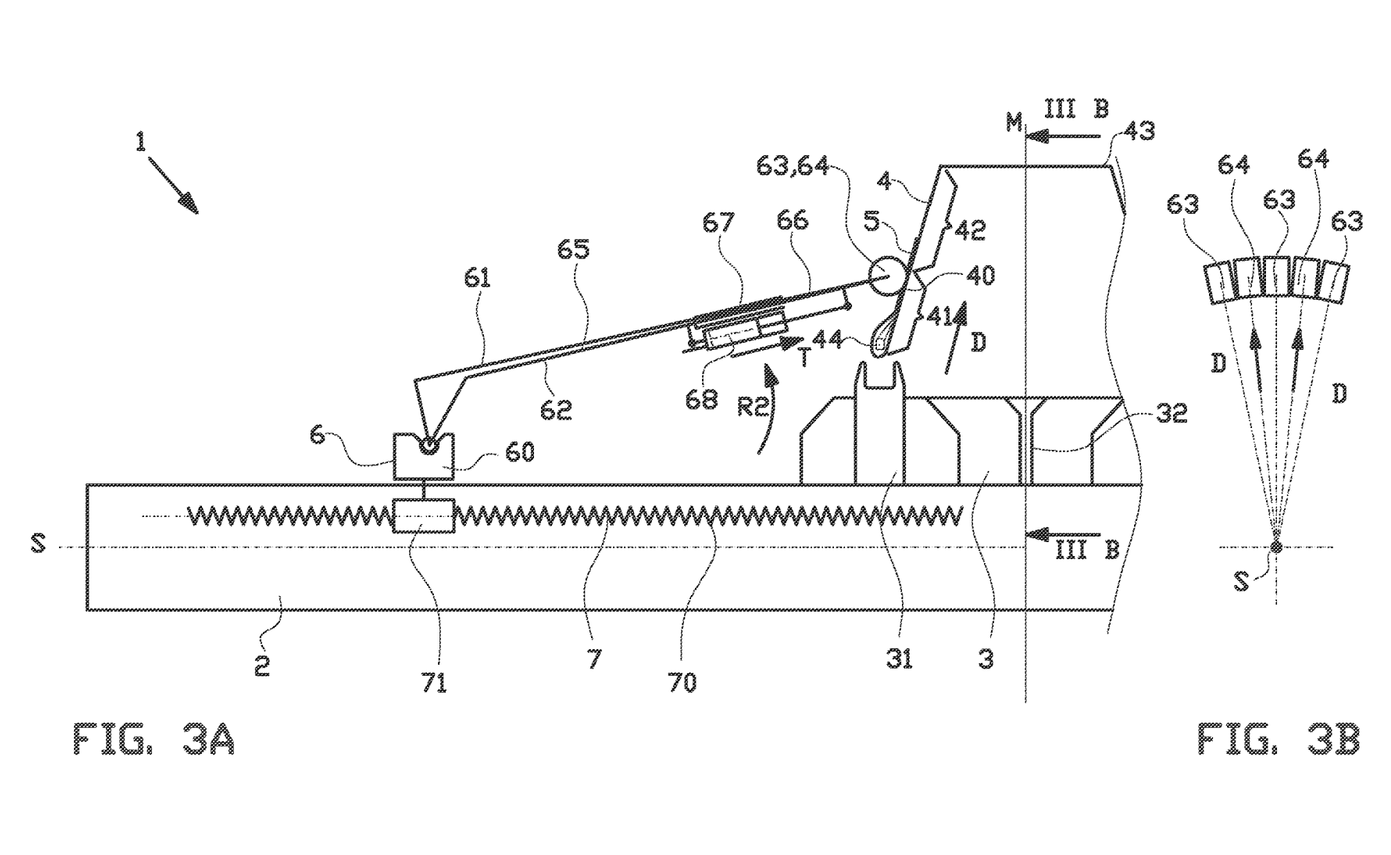
Figure 6A:
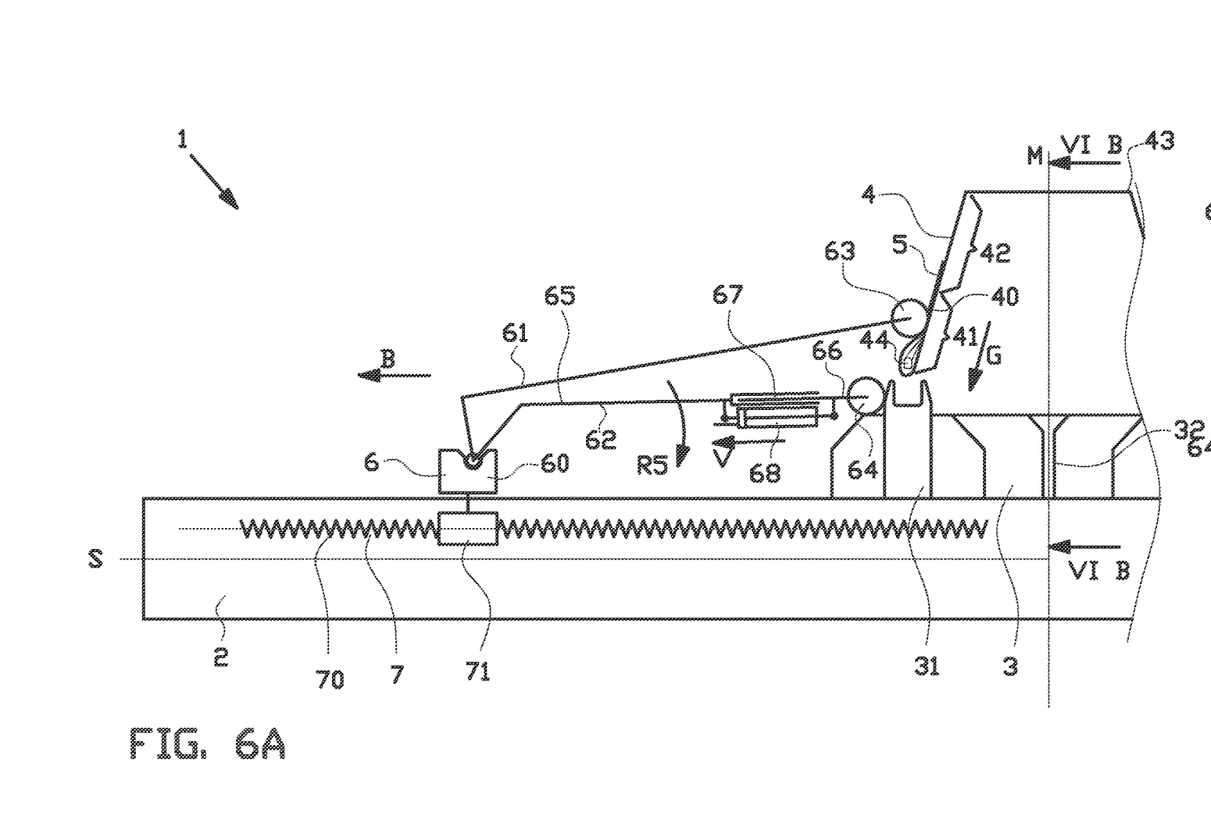

As best seen in FIG. 2A, the secondary arm 62 comprises a first arm part 65 and a second arm part 66. Both arms parts 65, 66 extend in the longitudinal direction of the secondary arm 62. The first arm part 65 is coupled to the arm support 60. At the opposite end of the first arm part 65 with respect to the arm support 60, the first arm part 65 is provided with a slide bearing 67 for slidably receiving the second arm part 66. The second arm part 66 is arranged to slide in the slide bearing 67 in a direction in line with or parallel to the first arm part 65. The first arm part 65 and the second arm part 66 are operationally coupled to each other via an actuator, preferably in the form of a linear actuator, in this example a pneumatic piston actuator 68. The pneumatic actuator 68 is arranged to displace the second arm part 66 with respect to the first arm part 65 in the longitudinal direction of the secondary arm 62, so as to extend or decrease the overall length of the secondary arm 62 in an extension direction T and a retraction direction V, respectively, as shown in FIGS. 3A and 6A. In particular, the slide bearing 67 and the pneumatic actuator 68 are adapted for displacing the second arm part 66 with respect to the first arm part 65 in a range that allows for the overall length of the secondary arm 62 to be extended up to the overall length of the primary arm 61 and to be retracted to an overall length that is shorter than the overall length of the primary arm 61.

When the overall length of the secondary arm 62 is shorter than the overall length of the primary arm 61, the secondary turn-up roller 64 at the end of said shortened secondary arm 62 is trailing the primary turn-up roller 63 of the primary arm 61. More specifically, 'trailing' is defined as the situation in which the secondary pressing surfaces of one of the secondary turn-up rollers 64 of a group of arms 61, 62 is situated behind the primary pressing surface of one of the primary turn-up rollers 63 of the same group of arms 61, 62 when considered in the axial direction S of the drum shaft 2 in the direction of the mid plane M and/or when considered in the radial direction with respect to the center axis S of the drum shaft 2. In such a situation, the primary pressing surface of said primary turn-up roller 63 is in an axially and radially leading position with respect to the secondary pressing surface of the secondary turn-up roller 64. When the overall length of the secondary arm 62 is extended to the overall length of the primary arms 61, the secondary turn-up rollers 64 are moved towards and into the same axially and radially position as the primary turn-up rollers 63 in the leading position. In this position, the secondary pressing surfaces defined by the secondary turn-up rollers 64 are in the same circumference as the primary pressing surfaces defined by the primary turn-up rollers 63.

Figure 5A:
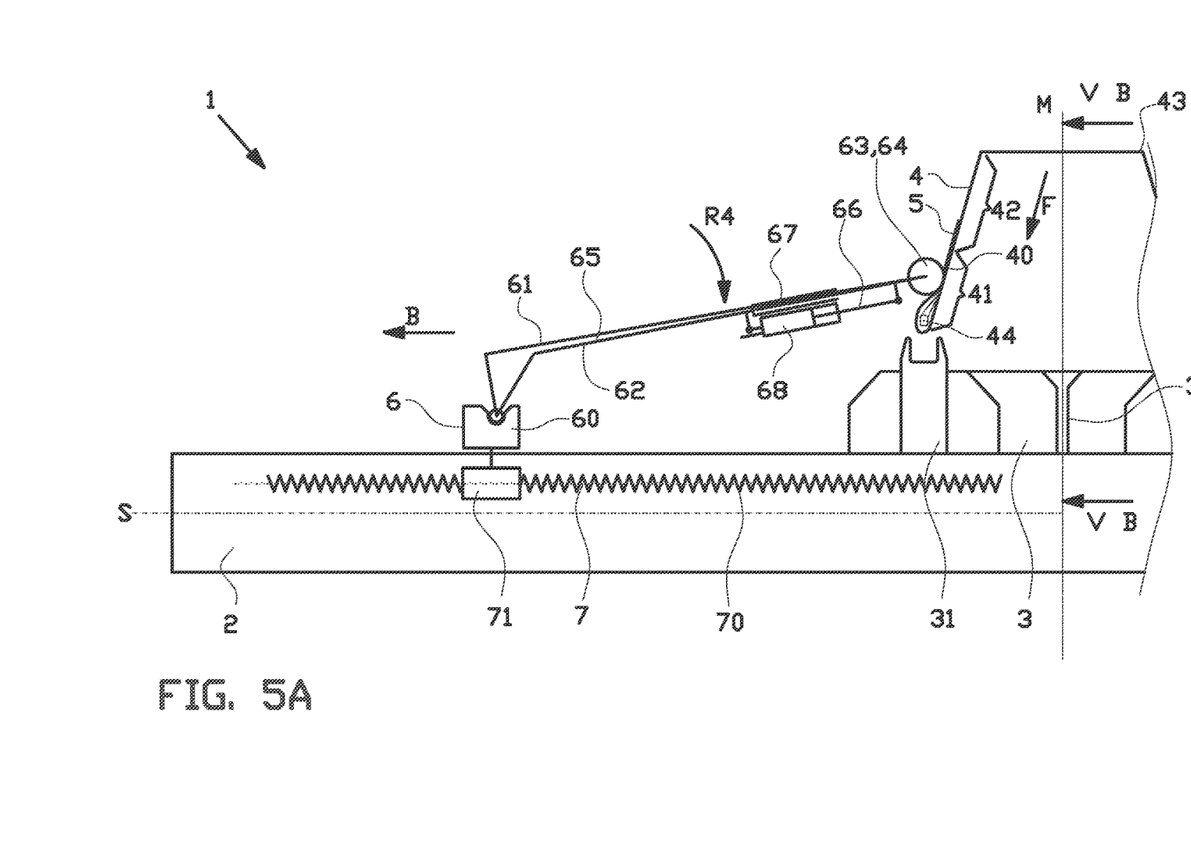

As shown in FIG. 1A, the tyre building drum 1 further comprises a drive 7 arranged inside of the drum shaft 2. The drive 7 comprises a spindle 70 that extends parallel to the center axis S of the drum shaft 2, and a driving nut 71 that is moved by the operation of the spindle 70 in a manner that is known per se. The driving nut 71 is operationally coupled to the arm support 60 of the group of arms 61, 62 to move said group of arms 61, 62 over the drum shaft 2 in an inward direction A towards the mid plane M, as shown in FIGS. 1A, 2A and 4A, and in an opposite outward direction B away from the mid plane M, as shown in FIGS. 5A and 6A. A similar drive 7 is arranged on the opposite side of the mid plane M to drive the other group of arms 61, 62 (not shown). The drives are preferably coupled or share the same spindle 70 to ensure synchronous movement of both groups of arms 61, 62.

The method for building the green tyre 4 with the use of the aforementioned tyre building drum 1 will be elucidated hereafter. The method can be performed repeatedly for building subsequent green tyres 4. Only one typical turning-up cycle or operation will be described hereafter.

FIGS. 1A and 1B show the situation prior to the turning-up operation. The tyre components for the green tyre 4 are placed on the tyre drum components 3 and the carcass 40 is in the expanded, torus like shape. The arms 61, 62 of the group of arms as shown in FIG. 1A are in an initial low position, in which the longitudinal direction of the arms 61, 62 extends substantially parallel to the center axis S of the drum shaft 2. The turn-up rollers 63, 64 of the arms 61, 62 are positioned at a radial position at the bottom of the tyre components for the green tyre 4, substantially at the same level as the bead holder 31. The bead 44 is clamped by the bead holder 31. The sidewall 5 extends outside of the bead holder 31 and rests on top of the primary turn-up rollers 63 of the primary arms 61.

The second arm parts 66 are retracted with respect to the first arm parts 65 of the secondary arms 62, such that the overall length of the secondary arms 62 is shorter than the overall length of the primary arms 61. As a result, the secondary turn-up rollers 64 are in a trailing position with respect to the primary turn-up rollers 63. As shown in FIG. 1B, the secondary turn-up rollers 64 are located behind the primary turn-up rollers 63. The sidewall 5 is now ready to be turned-up against the radial side of the expanded carcass 40. The drive 7 is initiated to move the arm support 60 over the drum shaft 2 in an inward direction A towards the mid plane M.

Figure 2B:
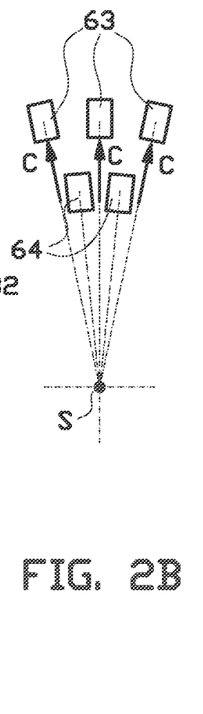
FIGS. 2B, 3B, 4B, 5B and 6B show side views of the section of the tyre building drum with the turn-up mechanism according to the lines IIB-IIB, IIIB-IIIB, IVB-IVB, VB-VB and VIB-VIB in FIGS. 2A, 3A, 4A, 5A and 6A, respectively.

FIGS. 2A and 2B show the situation wherein the arm support 60 has been moved by the drive 7 in the inward direction A. Subsequently, the primary arms 61 have moved upwards and over the bead holder 31 and onto the low portion 41 of the radial side of the expanded carcass 40. During the inward movement A of the arm support 60, the primary arms 61 are tilted or rotated upwards against the radial side of the carcass 40 in a first rotation R1 in their respective radial planes. As a result, the primary pressing surfaces of the primary turn-up rollers 63 are moved both radially outward and axially inward. The combined radial and axial movements result in an upwardly orientated translational movement C along the low portion 41 of the carcass 40. As best seen in FIG. 2B, the primary turn-up rollers 63 are diverging in the circumferential about the center axis S. In particular, in the situation as shown in FIG. 2B, the smallest space between two directly subsequent primary turn-up rollers 63 in the circumferential direction about the center axis S is greater than the space consumed by the interposed secondary turn-up roller 64 in the circumferential direction about the center axis S. Thus, the space between said two directly subsequent primary turn-up rollers 63 is sufficient for receiving the interposed secondary turn-up roller 64.

As shown in FIG. 2A, the secondary arms 62 have already started to move upwards and over the bead holder 31 as a result of the inward movement A of the arm support 60. Although the secondary turn-up rollers 64 are trailing the primary turn-up rollers 63 in both radial and axial direction, they can now start to press the low portion 41 of the carcass 40 at a radial distance from the position where the primary turn-up rollers 63 are pressing the carcass 40. This pressing by the secondary turn-up rollers 63 is beneficial during the first stages of the turning-up, as this allows for the sidewall 5 to be securely and tightly pressed against the radial side of the carcass 40. Now, the pneumatic actuators 68 of the secondary arms 62 can be activated to gradually extend the second arm parts 66 with respect to the first arm parts 65 of the secondary arms 62.

FIGS. 3A and 3B show the situation in which the pneumatic actuators 68 of the secondary arms 62 have been actuated. During the actuation of the pneumatic actuators 68, the inward movement A of the arms support 60 may be temporarily interrupted or slowed down to allow for the secondary arms 62 to be extended fully. The pneumatic actuators 68 move the second arm parts 66 with respect to the first arm parts 65 in the extension direction parallel to the longitudinal direction of the respective secondary arm 62. In the fully extended state of the second arm part 66, the overall length of the secondary arms 62 is extended to the overall length of the primary arms 61. By keeping the primary arms 61 at a fixed length and by merely extending the secondary arms 62, the rotation of the secondary arms 62 during the turning-up can be controlled independently of the primary arms 61.

During the gradual extension, the secondary arms 62 are tilted or rotated upwards against the radial side of the carcass 40 in a second rotation R2 in their respective radial planes. As a result, the secondary pressing surfaces of the secondary turn-up rollers 64 are moved both radially outward and axially inward. The combined radial and axial movements result in an upwardly orientated translational movement D along the low portion 41 of the carcass 40. As best seen in FIG. 3B, the secondary turn-up rollers 64 have moved into the spaces between the primary turn-up rollers 63, into the same leading position as the primary turn-up rollers 63. In this leading position, the primary pressing surfaces and the secondary pressing surfaces are situated in the same axial and radial position, and in the same circumference with respect to the center axis S. In particular, the central rotation axles (not shown) of the turn-up rollers 63, 64 are substantially aligned when considered in said circumference.

FIGS. 4A and 4B show the situation in which the drive 7 has moved the arm support 60 further in the inward direction A. Both arms 61, 62, now with the same overall length, are moved together or in unison along the high portion 42 of the carcass. The arms 61, 62 are tilted or rotated upwards against the radial side of the carcass 40 in a third, combined rotation R3 in their respective radial planes. As a result, the pressing surfaces of the turn-up rollers 63, 64 are moved both radially outward and axially inward. The combined radial and axial movements result in an upwardly orientated translational movement E along the high portion 42 of the carcass 40. The arms 61, 62 have now reached their high positions with the turn-up rollers 63, situated at the highest radius of the high portion 42 of the carcass 40, at the level of the radially outer circumferential surface 43 thereof. As best seen in FIG. 4B, the turn-up rollers 63, 64 are again diverging in the circumferential about the center axis S.

It is noted that the free space between the subsequent primary turn-up rollers 63 is significantly reduced by the presence of the secondary turn-up rollers 64, thereby spreading the pressing force exerted by the pressing surfaces of the turn-up rollers 63, 64 over a greater surface area. Thus, the imprints on the tyre components for the green tyre 4 as a result of said pressure can be significantly reduced. This is particularly relevant during the pressing of the high portion 42 of the carcass 40, as, at this high radial position, the primary turn-up rollers 63 are conventionally spread far apart.

Figure 5B:
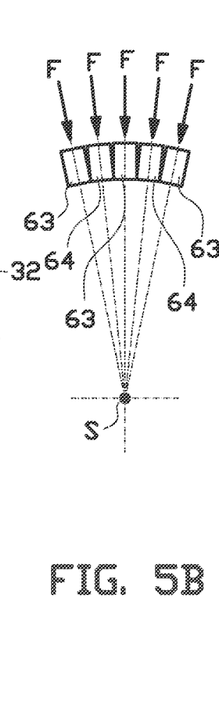

FIGS. 5A and 5B show the situation in which drive 7 reversely moves the arms support in the outward direction B to gradually lower the arms 61, 62 along the high portion 42 of the carcass 40. The secondary arms 62 remain in their extended position, such that the arms 61, 62 are rotated together or in unison in a fourth, combined rotation R4 in their respective radial planes. As a result, the pressing surfaces of the turn-up rollers 63, 64 are moved both radially inward and axially outward. The combined radial and axial movements result in a downwardly orientated translational movement F along the high portion 42 of the carcass 40.

As best seen in FIG. 5B, the space between the turn-up rollers 63, 64 in the circumferential direction about the center axis S decreases as the arms 61, 62 descend. FIG. 5B shows the situation just prior to the space between two directly subsequent primary rollers 63 becoming too small to accommodate the interposed secondary roller 62. Now, the pneumatic actuators 68 of the secondary arms 62 can again be activated to retract the second arm parts 66 with respect to the first arm parts 65 of the secondary arms 62.

Figure 6B:
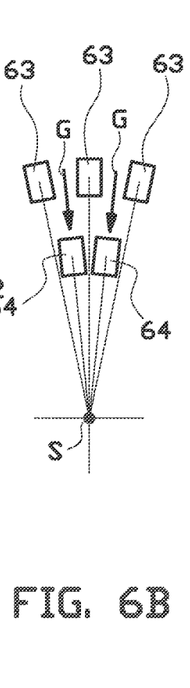

FIGS. 6A and 6B show the situation in which the pneumatic actuators 68 of the secondary arms 62 have been activated. As a result, the second arm parts 66 have been retracted with respect to the first arm parts 65 in a retraction direction V, parallel to the longitudinal direction of the respective secondary arms 62. The overall length of the secondary arms 62 is reduced and the secondary turn-up rollers 64 are retracted into their initial trailing position. The secondary arms 62 are allowed to descend further along the low part 41 of the carcass 40 in a fifth rotation R5, independently of the primary arms 61, into the initial position of the secondary arm 62, similar to the situation as shown in FIG. 1A.

Subsequently, the arm support 60 can be moved further in the outward direction B along the drum shaft 2 to allow the primary arms 61 to descend further along the low part 41 of the carcass 40. Then, the turning-up cycle or operation is completed and can be repeated for a new green tyre 4.

In summary, the invention relates to a tyre building drum having tyre components, wherein the tyre building drum is provided with a turn-up mechanism for turning-up the part of the tyre components, wherein the turn-up mechanism comprises a group of arms, wherein each group of arms comprises primary arms and secondary arms interposed between the primary arms, wherein, the primary arms and the secondary arms are provided with primary pressing elements and secondary pressing elements, respectively, for exerting a pressing force onto the tyre components during the turning-up, wherein the primary pressing elements are in a leading position, wherein the secondary arms are provided with actuators which are arranged for displacing the secondary pressing elements from an axially trailing position with respect to the axial position of the primary pressing elements in the leading position towards the same axial position as the primary pressing elements in the leading position.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A tire building drum for building a tire having tire components of rubber, including two beads, the tire building drum comprising:
   a drum shaft;
   two bead holders arranged around the drum shaft, the bead holders being mutually spaced apart in the axial direction of the drum shaft to support the tire components at the location of the beads, first portions of the tire components being situated between the two bead holders and being configured to be radially expanded;
   a turn-up mechanism configured to turn-up second portions of the tire components situated outside of the bead holders around the beads against the expanded first portions of the tire components to form the tire, the turn-up mechanism comprising
      a respective group of arms arranged on each side of the drum shaft outside of the bead holders,
      the arms of each group being coupled to the drum shaft via a respective axially moveable arm support at a first end,
      the arms extending from the arm support of the respective group of arms towards the bead holders in radial planes equally distributed about the drum shaft,
      the arms being tiltable in said radial planes about a coupling part with the arm support of the respective group of arms between a low position and a high position,
      each group of arms comprising primary arms and secondary arms interposed between the primary arms,
      the primary arms and the secondary arms, at a second end opposite to the first end, being provided with primary pressing devices and secondary pressing devices, respectively, configured to exert a pressing force onto the tire components during the turning-up, the primary pressing devices being in a leading position,
      the secondary arms being provided with pneumatic drives configured to displace the secondary pressing devices from an axially trailing position with respect to the axial position of the primary pressing devices in the leading position towards the same axial position as the primary pressing devices in the leading position,
   wherein the secondary pressing devices are configured to be moved from the trailing position into the leading position when the primary arms are tilted from low positions into high positions,
   during the tilting of the primary arms from the low positions to the high positions, the primary pressing devices are configured to diverge with respect to each other in the circumferential direction of the drum shaft, and
   the pneumatic drives are configured to displace the secondary pressing devices from the trailing position to the leading position when the space consumed by the individual secondary pressing devices in the circumferential direction of the drum shaft is less than the smallest space between two directly subsequent primary pressing devices in the same circumferential direction.

2. The tire building drum according to claim 1, wherein the pneumatic drives are configured to displace the secondary pressing devices from the axially trailing position with respect to the leading position of the primary pressing devices into substantially the same axial position as the primary pressing devices in the leading position.

3. The tire building drum according to claim 2, wherein, in the axially trailing position, the secondary pressing devices are in a radially trailing position with respect to the radial position of the primary pressing devices in the leading position, and
   wherein the pneumatic drives are configured to displace the secondary pressing devices towards the same radial position as the primary pressing devices in the leading position.

4. The tire building drum according to claim 3, wherein the pneumatic drives are configured to displace the secondary pressing devices into substantially the same or the same radial position as the primary pressing devices in the leading position.

5. The tire building drum according to claim 1, wherein the secondary pressing devices are configured to be displaced in a substantially longitudinal direction of the respective secondary arms.

6. The tire building drum according to claim 1, wherein each of the secondary arms comprises a first arm part and a second arm part, the first arm part being coupled to the arm support of the respective group of arms, the second arm part being moveable with respect to the first arm part and holding the secondary pressing device.

7. The tire building drum according to claim 6, wherein the pneumatic drives are operationally disposed between the first arm part and the second arm part of the respective secondary arms, to move the second arm part with respect to the first arm part.

8. The tire building drum according to claim 6, wherein the first arm part and the second arm part define the overall length of the secondary arm,
wherein the second arm part is configured to be moveable with respect to the first arm part within a range that allows for the overall length of the secondary arm to be smaller than, or equal to, the overall length of the primary arm.

9. The tire building drum according to claim 1, wherein the secondary arms are independently rotatable about the respective coupling part with the respective arm support with respect to the primary arms.

10. The tire building drum according to claim 1, wherein the primary and secondary pressing devices are substantially identical.

11. The tire building drum according to claim 1, wherein the primary and secondary pressing devices are primary and secondary turn-up rollers, respectively.

12. The tire building drum according to claim 11, wherein the diameter of the primary and secondary turn-up rollers are substantially the same.

13. A method for building a green tire having tire components of rubber, including two beads, the method comprising:
arranging the tire components around a drum shaft;
clamping the tire components at the beads;
expanding the part of the tire components situated between the beads; and
turning-up the part of the tire components situated outside the beads around the beads against the expanded part of the tire components to form the green tire,
exerting a pressing force onto the tire components during the turning-up, the pressing force being exerted by primary pressing elements and secondary pressing elements, the primary pressing elements being in a leading position,
wherein the method further comprises displacing, by pneumatic drives, the secondary pressing elements from an axially trailing position with respect to the axial position of the primary pressing elements in the leading position towards the same axial position as the primary pressing elements in the leading position,
the secondary pressing devices are configured to be moved from the trailing position into the leading position when the primary arms are tilted from low positions into high positions,
during the tilting of the primary arms from the low positions to the high positions, the primary pressing devices are configured to diverge with respect to each other in the circumferential direction of the drum shaft, and
the pneumatic drives are configured to displace the secondary pressing devices from the trailing position to the leading position when the space consumed by the individual secondary pressing devices in the circumferential direction of the drum shaft is less than the smallest space between two directly subsequent primary pressing devices in the same circumferential direction.

14. The method according to claim 13, wherein the secondary pressing elements are displaced from the axially trailing position with respect to the leading position of the primary pressing elements into substantially the same axial position as the primary pressing elements in the leading position.

15. The method according to claim 14, wherein, in the axially trailing position, the secondary pressing elements are in a radially trailing position with respect to the radial position of the primary pressing elements in the leading position, and
wherein the secondary pressing elements are displaced towards the same radial position as the primary pressing elements in the leading position.

16. The method according to claim 15, wherein the secondary pressing elements are displaced into substantially the same or the same radial position as the primary pressing elements in the leading position.

17. The method according to claim 13, wherein the part of the tire components situated between the bead is expanded into a shape with a radial sidewall,
wherein the radial sidewall is divided into an inner radial portion or low portion and an outer radial portion or high portion,
wherein the secondary pressing elements are moved from the trailing position into the leading position when the primary pressing elements are moved from the low portion to the high portion of the tire components.

18. The method according to claim 17, wherein, during the movement of the primary pressing elements from the low portion towards the high portion of the tire components, the primary pressing elements are diverging with respect to each other in the circumferential direction of the drum shaft, and
wherein the secondary pressing elements are displaced from the trailing position into the leading position when the space consumed by the individual secondary pressing elements in the circumferential direction of the drum shaft is less than the smallest space between two directly subsequent primary pressing elements in the same circumferential direction.

* * * * *